July 18, 1967 R. V. PROFFITT 3,331,309
FRYING APPARATUS

Filed May 4, 1965 3 Sheets-Sheet 2

INVENTOR.
RICHARD V. PROFFITT

BY David M. Schiller
ATTORNEY

July 18, 1967 R. V. PROFFITT 3,331,309
FRYING APPARATUS

Filed May 4, 1965 3 Sheets-Sheet 3

INVENTOR.
RICHARD V. PROFFITT
BY David M. Schiller
ATTORNEY

United States Patent Office 3,331,309
Patented July 18, 1967

3,331,309
FRYING APPARATUS
Richard V. Proffitt, Chicago Heights, Ill. assignor to
General Electric Company, a corporation of New York
Filed May 4, 1965, Ser. No. 452,981
3 Claims. (Cl. 99—411)

ABSTRACT OF THE DISCLOSURE

A food fryer includes a fat container having a front wall with a lower inner surface sloping upwardly and forwardly and terminating in an intermediate surface which extends forwardly with a slight upward inclination. A food basket includes a projection on its front which is moved into latching engagement with the underside of a hook on the front wall of the container in response to sliding of the lower front edge of the basket upwardly along the lower surface onto the intermediate surface by application of a pulling force to the basket handle. The projection is released from the hook and the lower edge of the basket is moved off the intermediate surface by application of a downwardly directed force to the handle.

Conventional friers include a fat container and a wire mesh basket movable relative to the container between a lower frying position wherein the basket is within the container and an elevated or raised drain position wherein the basket is adjacent the open end of the container. Latch means are generally provided to latch the basket in its drain position. With previous frier designs it is ordinarily necessary for the operator to use both hands to grip the basket handle and apply substantial forces for effecting the required raising and lowering movements of the basket. Moreover, in order to latch the basket in its elevated position it has been necessary in prior designs to effect considerable manipulation of the basket while the basket is in an elevated position until the basket can be properly located in latching engagement with the container. In many designs an initial basket lifting movement is required to release the latch means. Also, it is the normal practice to shake the basket occasionally during the frying process to work the food into the fat and also to prevent sticking thereof. All of these operations usually require the use of both hands of the operator. The two-hand operation previously required not only prevents the operator from performing other functions during manipulations of the basket, but also is time consuming and tiresome and contributes to undesirable inefficiencies and delays in the frying process.

The present invention overcomes these and other disadvantages of prior frier designs and permits frying operations to be performed with increased efficiency and speed and with minimum operator effort.

It is therefore a primary object of the invention to provide novel and improved frying apparatus permitting highly efficient and rapid frying operations with minimum operator effort.

It is another object of the invention to provide frying apparatus having novel and improved means permitting easy and rapid shaking of the food containing basket by single-hand operation.

It is a further object of the invention to provide frying apparatus having novel and improved means by which the food containing basket can be very quickly raised to a drain position and positively and rapidly latched in such position with minimum operator effort and basket manipulation.

It is still another object of the invention to provide frying apparatus having novel and improved means by which the food containing basket is positively guided into a latched drain position in response to single-hand application of a small predominately pulling force to the basket handle by the operator.

It is a still further object of the invention to provide frying apparatus as defined in the preceding object wherein the basket can be quickly released from its latched position in response to single-hand application of a small predominately downwardly directed force to the basket handle by the operator.

In carrying out the invention in one form frying apparatus is provided including a fat container including a base and also side, front and rear walls and an open top. The front wall of the container includes an inner surface having a sloped portion which extends upwardly with a forward inclination. The apparatus includes a wire mesh basket for receiving food to be fried and the basket includes a handle by which it can be manually moved between a lower frying position wherein it is within the container and an elevated drain position wherein it is adjacent the open top of the container. The basket also includes a lower front edge adapted to slide along the sloped portion during raising and lowering of the basket. A pair of cooperating latch members are located on the basket and on the container for releasable interfitting engagement in response to movement of the basket from its lower position to its elevated position by application of a small predominately pulling force to the handle effective to slide the lower front edge of the basket along the sloped inner surface of the front wall. This force is conveniently applied by single-hand operation and the latch members are readily released by application of a small predominately downwardly directed force to the handle which also can be applied by single-hand operation.

Other objects and advantages of the invention will become apparent from the following description taken in conjunction with the accompanying drawings in which.

Figure 1:
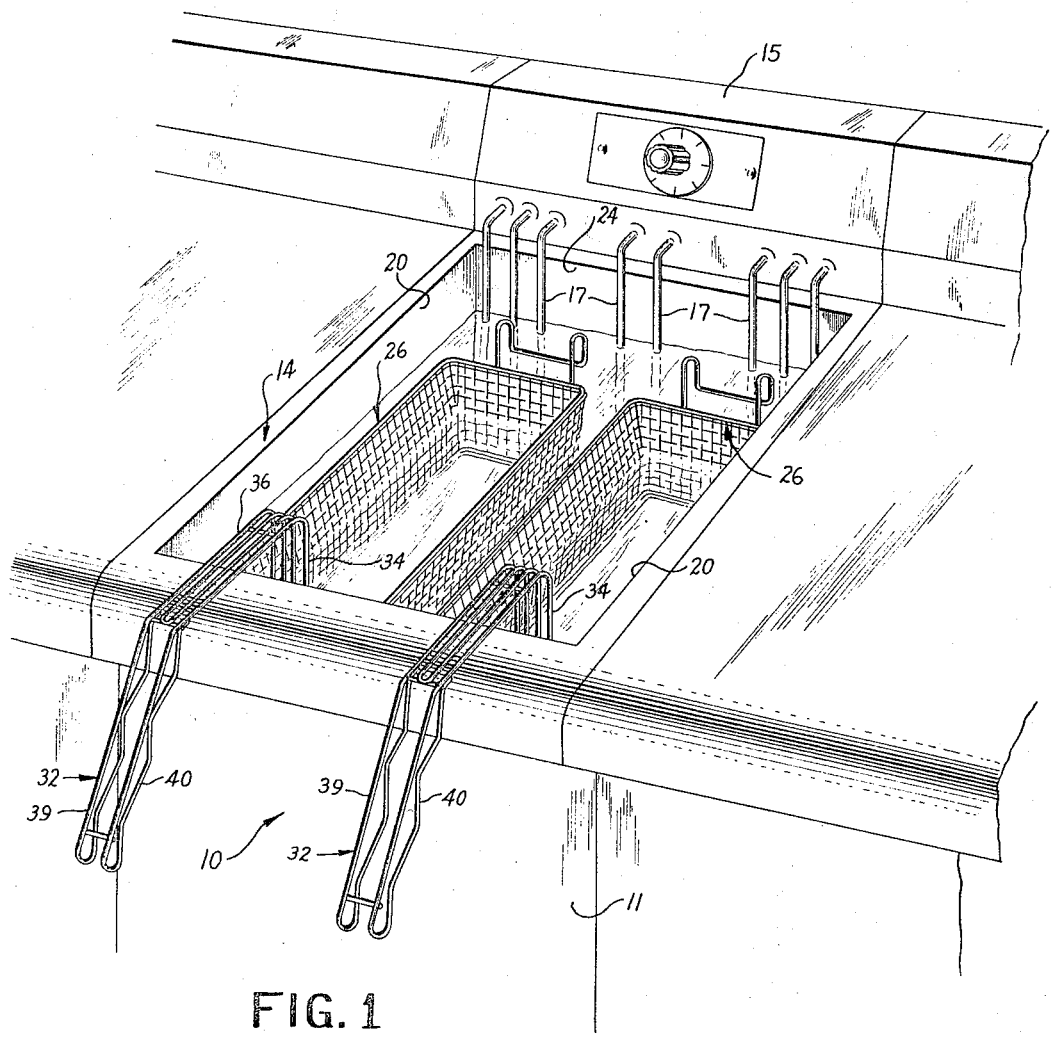
FIGURE 1 is a view in perspective showing the frying apparatus of the present invention including a pair of food-containing baskets.

Referring now to the drawing there is illustrated in FIG. 1 frying apparatus including a housing 10 having a vertical front plate 11 and a horizontal top panel 12 (FIG. 2) containing an opening 13 to receive a fat container 14. A control head 15 is mounted on the top panel 12 at the rear thereof and may be mounted for swinging movement about a horizontal axis as disclosed in United States Patent 2,805,314. The control head 15 supports a plurality of electric heating elements 17 shown in FIG. 1. The heating elements form no part of the present invention and may be of any suitable construction and configuration. Suffice it to say that the heating elements are adapted for positioning within the container 14 and are effective when energized to heat the fat in the container to the proper frying temperature.

The container 14 is formed from any suitable material, such as steel, and includes a base 18, a pair of spaced vertically extending side walls 20 upstanding from the base, a front wall 22 and a rear wall 24. The base 18 is preferably sloped to facilitate fat draining. The top of the container is open so that the container can receive through its open top one or more wire mesh baskets 26 which are adapted to receive food to be fried. In FIG. 1 two such baskets 26 are shown in side-by-side relationship in their lower frying positions within the container 14. Each of the baskets when in its lower frying position within the container is spaced from the base 18 by means of a suitable basket support 28 between the base 18 and the basket as best shown in FIG. 2 wherein only one of the baskets is illustrated.

Figure 2:
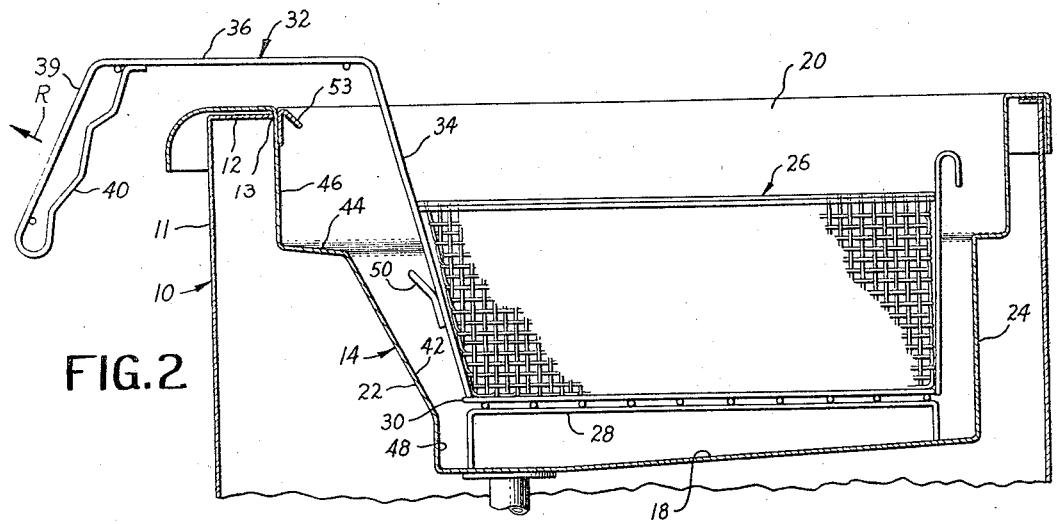
FIGURE 2 is a view in section of the apparatus of FIGURE 1 with parts broken away showing one of the baskets in its lower frying position within the fat container.

The baskets 26 are of identical construction each being formed of a rigid wire framework including a bottom portion having a protruding front edge 30 as shown in FIG. 2 adapted to engage a portion of the inner surface of the front wall 22 of the container 14 during raising and lowering movements of the basket as described hereinafter. Each basket has a wire handle 32 including a section 34 which projects upwardly from the basket above its open top and which connects to an additional horizontally extending central section 36 which in turn connects to a front gripping section extending forwardly and downwardly at the front of the plate 11. The gripping section has an outer portion 39 spaced from an undulating inner portion 40 and is configured to form a pistol grip to permit comfortable and effective manual gripping thereof by an operator.

In accord with the invention the apparatus is designed so that an operator can easily and rapidly effect movements of the basket between its lower and elevated positions by single-hand operation and with the application of a minimum force to the handle. To this end, the front wall 22 of the container 14 has an inner surface including a first surface portion 42 which extends upwardly with a forward inclination and along which the lower front edge 30 of the basket slides during raising and lowering movements of the basket. The inner surface of the front wall 22 also includes a second surface portion 44 extending forwardly from the upper end of the surface portion 42 with a slight upward inclination, and a third surface portion 46 extending vertically from the forward end of the surface portion 44. The inner surface of the wall 22 finally includes a short surface portion 48 shown extending vertically between the base 18 and the lower end of the first surface portion 42.

In order to retain the basket in its elevated drain position the invention provides latch means including a pair of cooperating latch members on the container and on the basket adapted for releasable interfitting engagement in response to arrival of the basket to a predetermined elevated position. In the illustrated embodiment of the invention one of the cooperating latch members comprises a projection 50 attached to the front of the basket in any suitable manner adjacent the central portion thereof and inclined upwardly and forwardly. The other latch member which cooperates with the projection 50 comprises a hook 53 attached to the surface portion 46 of the front wall 22 of the container adjacent the top thereof. The hook 53 extends rearwardly and downwardly and is adapted to overlie the projection 50 when in latching engagement therewith.

Figure 3:
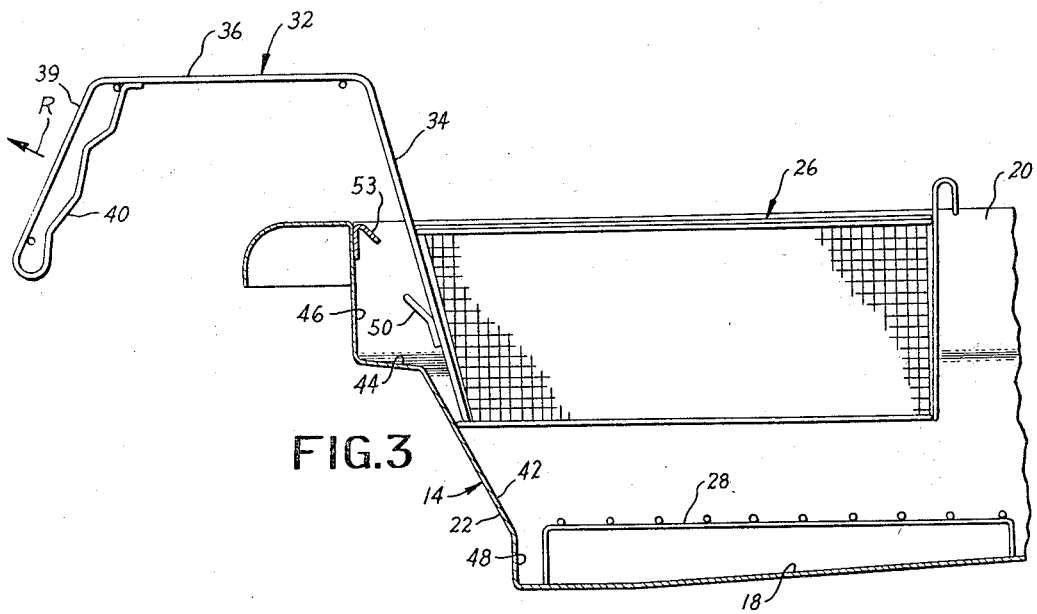
FIGURE 3 is a view similar to FIGURE 2 showing the basket approximately midway in its path of movement from its lower position of FIGURE 2 towards its raised latched position.
Figure 4:
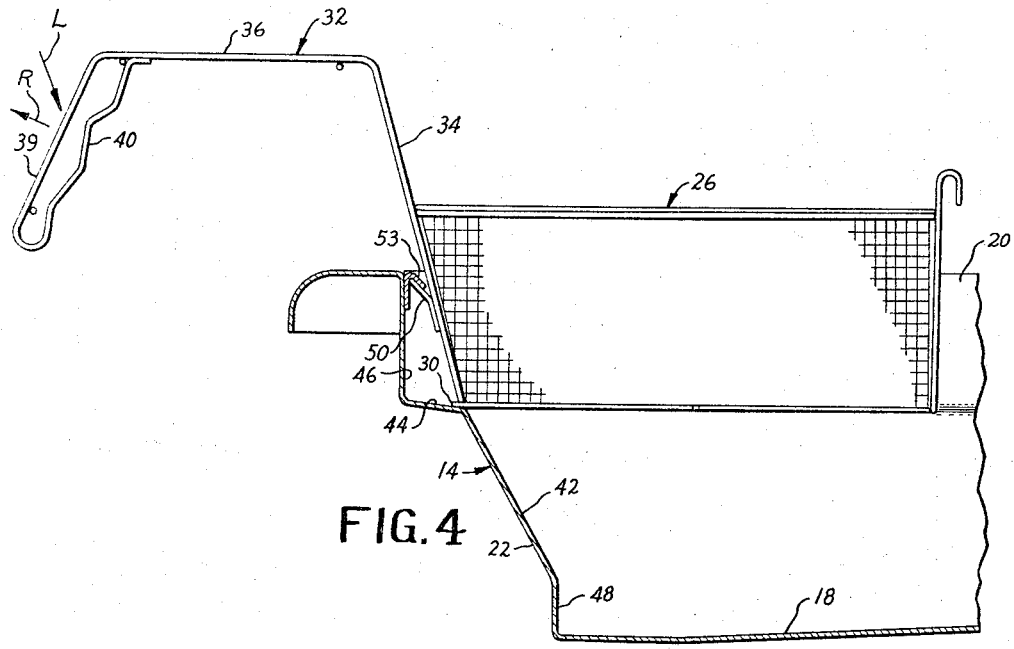
FIGURE 4 is a view similar to FIGURES 2 and 3 showing the basket in its raised latched position.
Figure 5:
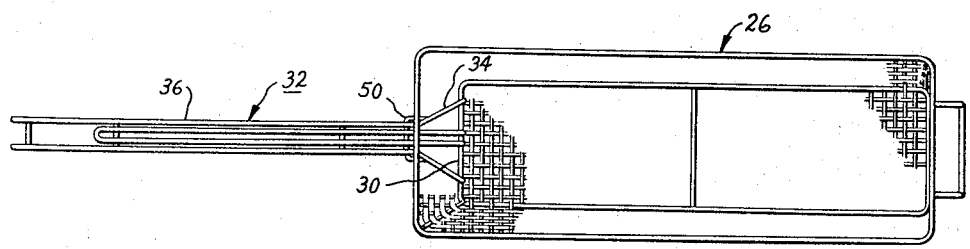
FIGURE 5 is a view in top plan of the basket of FIGURES 2–4.
Figure 6:
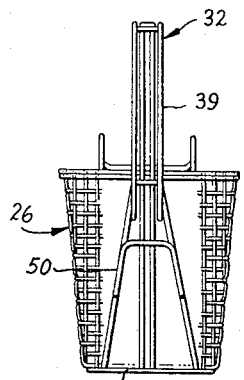
FIGURE 6 is a view in front elevation of the basket shown in FIGURE 5.

Operation of the apparatus will now be described. Let it be assumed that the basket 26 is in its lower frying position as illustrated in FIG. 2 and that it is desired to raise the basket to its elevated drain position and to latch the basket in such position. To raise the basket the operator merely grasps the pistol grip portion of the handle with one hand and exerts a small force acting generally in the direction of the arrow R in FIG. 2 which is observed to have a predominantly forwardly directed component and a slight upwardly directed component. Application of such force to the handle results in movement of the lower front edge 30 of the basket into engagement with the surface portion 42 and upwardly along such surface portion as shown in FIG. 3. Continued application of the force to the handle causes the edge 30 to eventually move off the surface portion 42 onto the surface portion 44. When this occurs, the basket is positioned as shown in FIG. 4 with the projection 50 underlying the hook 53 and the weight of the basket and of the food load therein causes the basket to rotate slightly in a clockwise direction as viewed in FIG. 4 about the gripping portion of the handle being held by the operator. Such rotation of the basket occurs during the continued application of the force to the handle and results in movement of the projection 50 into engagement with the undersurface of the hook 53. With the action above-described the basket is positively guided to and wedged in its latched position. The operator may now release the handle with the knowledge that the basket cannot become accidentally unlatched. The basket is retained in its latched position by a generally rearwardly directed force of engagement of the projection 50 with the undersurface of the hook 53 produced by the weight of the basket and its contents.

In order to lower the basket from its elevated position shown in FIG. 4 it is only necessary for the operator to apply a small force to the gripping portion of the handle acting generally in the direction of the arrow L shown in FIG. 4. Application of such force results in slight pivotal movement of the basket in a counterclockwise direction as viewed in FIG. 4 about the area of engagement of the projection 50 and the hook 53. This causes the lower front edge 30 of the basket to move downwardly and rearwardly along the surface portion 44 until it passes onto the surface portion 42. When this occurs, the vertical support force for the basket is removed and the edge 30 of the basket will slide down the surface 42. A slight holding force should be applied to the handle at this time to restrict the free fall of the basket into the container 14.

It is thus seen that the invention permits an operator to quickly raise and lower the basket by single-hand application to the handle of small forces. This of course permits the operator to simultaneously manipulate two baskets such as shown in FIG. 1 resulting in very efficient and high speed frying operations. The basket is readily raised and latched in its raised position by a single quick motion thereof produced by the application of a small predominately forwardly directed force to the handle. The cumbersome and tiresome two-hand manipulation of the basket in vertical directions previously required is thus avoided by the invention. The invention also facilitates the basket shaking operation which is normally conducted to work the food product into the fat and to prevent sticking thereof. In the present invention shaking of the basket is conveniently accomplished merely by rapidly raising and lowering the basket along the inclined surface portion 42.

Excellent results have been attained by forming the surface portion 42 with an inclination angle with respect to a vertical line of approximately 26°. Also, the inclination angle of the surface portion 44 with respect to a horizontal line is desirably of the order of 5°.

Although the invention has been described with reference to certain specific embodiments thereof, numerous modifications are possible and it is desired to cover all modifications falling within the spirit and scope of the invention.

What I claim as new and desire to secure by Letters Patent of the United States is:

1. Frying apparatus comprising in combination, a container for receiving fat to be heated, said container having a base, side walls, front and rear walls, and an open top, said front wall having a lower inner surface extending upwardly with a forward inclination, an intermediate inner surface extending forwardly from said lower surface with a slight upward inclination, and an upper inner surface above said intermediate surface, a rearwardly and downwardly extending hook on said upper surface, a basket for receiving food to be fried having a lower front edge, a handle on the basket by which the basket can be manually moved between a lower frying position wherein it is within the container and an elevated drain position wherein it is adjacent the open top of the container, and a projection on the front of said basket inclined upwardly and forwardly, said projection being moved into overlapping engagement with the underside of said hook in response to movement of the basket from its lower position to its elevated position by application of a predominately forwardly directed force to the handle effective to slide the lower front edge of the basket along the lower surface of the front wall onto said intermediate surface, said basket being releasably retained in its elevated position by a generally rearwardly directed force of engagement of said projection with said hook produced by the weight of the basket and its contents and the engagement of the lower front edge of the basket with said intermediate surface, said basket being released from its elevated position by application of a predominately downwardly directed force on the handle to disengage said projection from the hook and to slide the front edge of the basket rearwardly down the slight incline of said intermediate surface.

2. Frying apparatus comprising in combination, a container for receiving fat to be heated, said container having a base, side walls, front and rear walls, and an open top, said front wall having a lower inner surface extending upwardly with a forward inclination, an intermediate inner surface extending forwardly from said lower surface with a slight upward inclination, and an upper inner surface above said intermediate surface, a rearwardly and downwardly extending hook on said upper surface, a basket for receiving food to be fried having a lower front edge, a handle on the basket by which the basket can be manually moved between a lower frying position wherein it is within the container and an elevated drain position wherein it is adjacent the open top of the container, said handle including a downwardly and forwardly extending portion which is located forwardly of the container when the basket is in its lower position and which is adapted to be grasped by an operator, and a projection on the front of said basket inclined upwardly and forwardly, said projection being moved into overlapping engagement with the underside of said hook in response to movement of the basket from its lower position to its elevated position by application of a predominately forwardly directed force to the handle effective to slide the lower front edge of the basket along the lower surface of the front wall onto said intermediate surface, said basket being releasably retained in its elevated position by a generally rearwardly directed force of engagement of said projection with said hook produced by the weight of the basket and its contents and the engagement of the lower front edge of the basket with said intermediate surface, said basket being released from its elevated position by application of a predominately downwardly directed force on the handle to disengage said projection from the hook and to slide the front edge of the basket rearwardly down the slight incline of said intermediate surface.

3. Frying apparatus comprising in combination, a container for receiving fat to be heated, said container having a base, side walls, front and rear walls, and an open top, said front wall having a lower inner surface extending upwardly with a forward inclination, an intermediate inner surface extending forwardly from said lower surface with a slight upward inclination, and an upper inner surface above said intermediate surface, a rearwardly and downwardly extending hook on said upper surface, a basket for receiving food to be fried having a lower front edge, a handle on the basket by which the basket can be manually moved between a lower frying position wherein it is within the container and an elevated drain position wherein it is adjacent the open top of the container, said handle including a downwardly and forwardly extending portion which is located forwardly of the container when the basket is in its lower position and which is adapted to be grasped by an operator, and a projection on the front of said basket inclined upwardly and forwardly, said projection being moved into overlapping engagement with the underside of said hook in response to movement of the basket from its lower position to its elevated position by application of a predominately forwardly directed force to the handle effective to slide the lower front edge of the basket along the lower surface of the front wall onto said intermediate surface, said basket being releasably retained in its elevated position by a generally rearwardly directed force of engagement of said projection with said hook produced by the weight of the basket and its contents and the engagement of the lower front edge of the basket with said intermediate surface, said basket being released from its elevated position by application of a predominately downwardly directed force on the handle to disengage said projection from the hook and to slide the front edge of the basket rearwardly down the slight incline of said intermediate surface, said lower surface being inclined forwardly from the vertical at an angle of the order of 27°, said intermediate surface being inclined upwardly from the horizontal at an angle of the order of 5°.

References Cited

UNITED STATES PATENTS

| | | | |
|---|---|---|---|
| 2,219,950 | 10/1940 | Childs | 99—410 X |
| 2,593,392 | 4/1952 | Budlane et al. | 99—411 X |
| 2,593,549 | 4/1952 | Finch | 99—411 |
| 2,597,695 | 5/1952 | Braski et al. | 99—411 X |
| 2,696,370 | 12/1954 | Gafford | 259—108 |
| 2,822,747 | 2/1958 | Schwaneke | 99—411 |

WALTER A. SCHEEL, *Primary Examiner.*

J. NEARY, *Assistant Examiner.*